Figure 1:
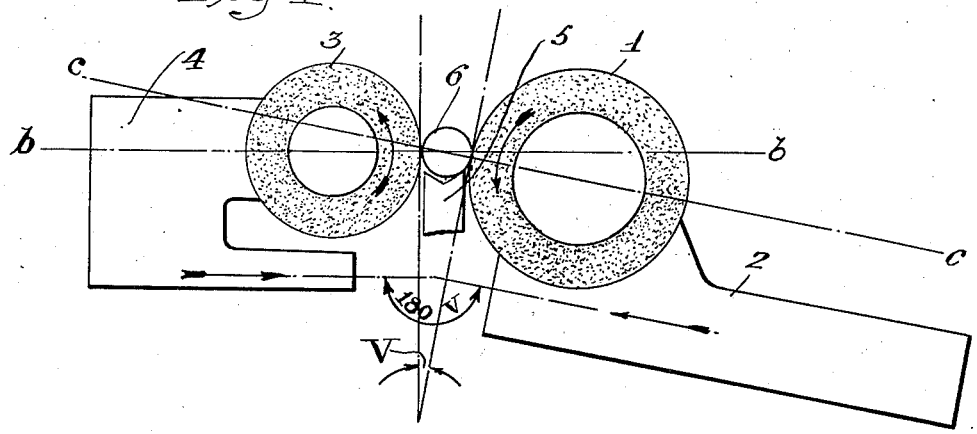

June 22, 1943.  C. G. EKHOLM  2,322,619

CENTERLESS GRINDING MACHINE

Filed Oct. 10, 1940  2 Sheets-Sheet 1

Inventor.
Carl Gustav Ekholm
By: Howson & Howson
attys.

June 22, 1943.  C. G. EKHOLM  2,322,619
CENTERLESS GRINDING MACHINE
Filed Oct. 10, 1940  2 Sheets-Sheet 2
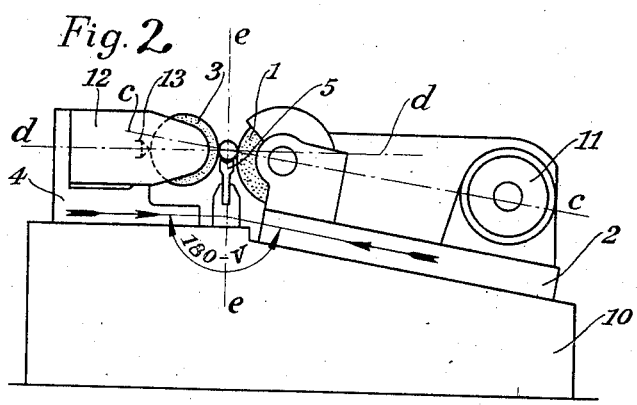
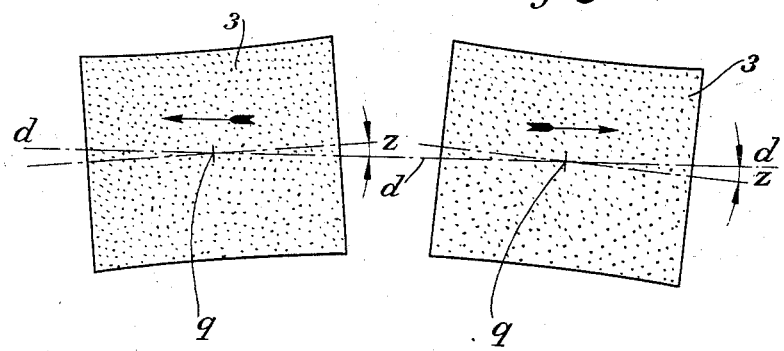
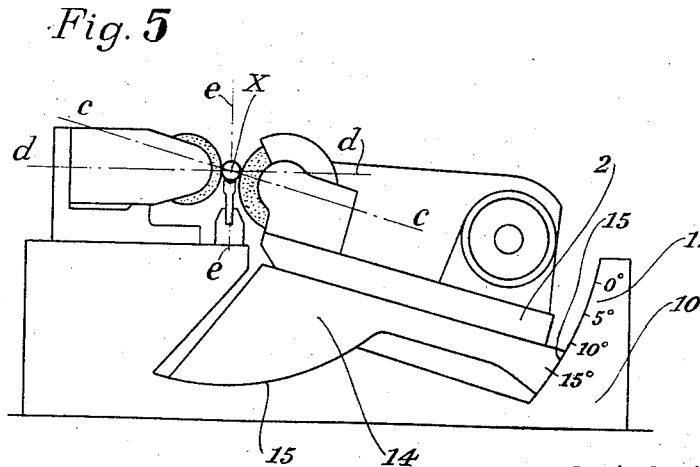
INVENTOR
Carl Gustav Ekholm
BY Chas. Lynn Russell
HIS ATTORNEY Patented June 22, 1943

2,322,619

UNITED STATES PATENT OFFICE 2,322,619

CENTERLESS GRINDING MACHINE

Carl Gustav Ekholm, Lidkoping, Sweden

Application October 10, 1940, Serial No. 360,527
In Sweden November 4, 1939

9 Claims. (Cl. 51—103)

The present invention relates to a centerless grinding machine having a machine bed and a grinding wheel mounted on a slide and a regulating wheel mounted on another slide on the machine bed and a work support. In centerless grinding machines of this type the two slides in the known constructions have been slidable in the same direction, usually in a horizontal direction. During the grinding operation the workpiece is in contact with the regulating wheel and the work support and the grinding wheel, the two wheels forming between themselves a so-called grinding throat. If the grinding operation is to lead to a successive decreasing of the out-of-roundness of the workpiece, the work support should be set in such a height, that the center of the workpiece is situated some distance above or beside the narrowest part of the grinding throat on the side thereof opposite to the work support, so that the work piece is free to move to a wider part of the grinding throat. The distance of the center of the workpiece from the narrowest part of the grinding gap is of decisive importance for the accurateness as to roundness of the workpiece obtained by the grinding operation. However, the preferred distance is different for different diameters of the workpiece and the grinding and the regulating wheels.

A thorough examination has shown that the value decisive for the result of the grinding operation is the angle between the tangents, which are passing through the tangent points of the workpiece with the grinding wheel and the regulating wheel respectively. Said angle should have a value between 5° and 20° and preferably should be about 10°. For a certain settled value for this angle, for instance 10°, it is possible for each combination of diameters of the grinding wheel, the work piece and the regulating wheel to calculate the corresponding distance of the center of the workpiece from the narrowest part of the grinding throat. In this way the correct positioning of the work support can be calculated, but even if curves and tables were made up for all the corresponding values the adjustment of the work support will be a time-consuming operation which can hardly be performed by unqualified workers.

According to the present invention the desired angle between the tangents is obtained thereby that the two slides carrying the grinding and regulating wheels are mounted on guides that form an obtuse angle with each other. If the work support is set in a suitable height as will be described in connection with the enclosed drawings, the connecting lines between the centres of the workpiece and the centres of the grinding wheel and the regulating wheel will form an obtuse angle, which is 180° minus the desired angle between the tangents. If thus for instance an angle between the tangents of 10° is desired, the angle between the connecting lines should be 170°. When the grinding wheel and the regulating wheel are coming in contact with the workpiece, its tangents with the wheels will form the desired angle, and the grinding operation will take place under advantageous conditions.

Figure 6:
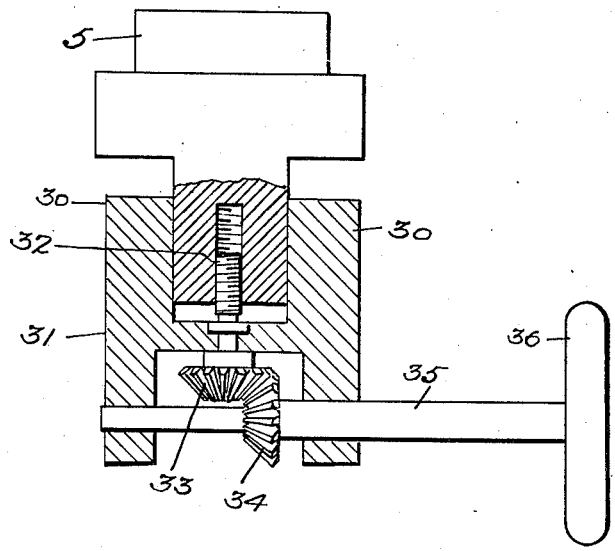

Through the arrangement according to the invention the time necessary for adjustment of the work support is reduced and the correct position of the workpiece in relation to the grinding wheel and the regulating wheel is secured. Further advantages will be clear from the following specification in connection with the enclosed schematical drawings. Fig. 1 shows schematically a centerless grinding machine according to the present invention. Fig. 2 shows a grinding machine according to the invention more in detail than Fig. 1. Figs. 3 and 4 show the regulating wheel in two different positions. Fig. 5 shows in vertical projection a modified embodiment of the invention. Fig. 6 is an enlarged vertical projection, partly in section and in greater detail, of the adjustable work support as viewed at right angles to Fig. 2. In all figures corresponding parts have been designated with the same numerals of reference.

The centerless grinding machine according to the invention is constructed automatically to give the desired angle between the tangents through the points of contact between the workpiece and the grinding wheel respectively the regulating wheel. Fig. 1 shows schematically a centerless grinding machine according to the invention having a bed and two slides mounted on guides on the bed.

The grinding wheel 1 is carried by a slide 2 and the regulating wheel 3 by a slide 4. The regulating slide 4 in the shown embodiment is slidable in a horizontal direction, whereas the grinding wheel slide 2 is slidable in a direction, which is forming an obtuse angle of 180—$v$° with the horizontal plane where $v$ is the desired angle between the tangents of the workpiece through its points of contact with the grinding wheel and the regulating wheel. The work support 5 is so arranged in relation to the grinding wheel slide that its plane of symmetry or the plane containing the center line of the workpiece will contain also the line of the intersection between the horizontal plane b—b containing the axis of rotation of the regulating wheel and a plane c—c containing the axis of rotation of the grinding wheel and extending in the direction of movement of the grinding wheel slide. The work support is adjusted in a such height that the center line of a workpiece resting on the same will coincide with the line of intersection between the planes b—b and c—c. When the center line of the workpiece is coinciding with the said line of intersection, and the grinding wheel is moved into contact with the workpiece, the tangents of the grinding wheel and the regulating wheel in their points of contact with the workpiece will form the desired angle $v$ (10°) with each other. The same angle will always be obtained independent of the diminishing diameters of the grinding wheel and the regulating wheel on account of wearing off or truing. The reduction of the diameter of the workpiece during the grinding operation is as a rule so slight that it has no essential influence on the angle between the tangents. The adjustment necessary for the grinding operation is thus reduced to a simple height adjustment of the work support in such a manner that the center line of the workpiece will come in a definite position. This adjustment can be easily performed with the aid of a graduated gauging finger or the like.

Fig. 2 shows a centerless grinding machine according to the invention more in detail than Fig. 1. The grinding wheel slide 2 and the regulating slide 4 are carried by a box-shaped machine-bed 10. The grinding wheel 1 is driven from a motor 11 mounted on the grinding wheel slide. The regulating wheel is driven from a motor within the bed and not shown in the drawings. The regulating wheel 3 is not mounted directly on the regulating slide 4 but on a head 12, which is turnably mounted on the slide 4 so that the axis of rotation of the regulating wheel can be skewed a greater or smaller angle as a rule 0–6° in relation to the longitudinal direction of the work support. The turning axis of the head 12 intersects the axis of rotation of the regulating wheel under right angle and is located in a plane d—d, extending in the direction of movement of the regulating slide and parallel with the axis of rotation of the grinding wheel. The grinding wheel slide is slidable in a direction forming an obtuse angle of 180—$v°$ with the direction of movement of the regulating slide and thus also with the plane d—d. The work support 5 is adjustable in a vertical direction and is so positioned that its plane of symmetry or the plane e—e containing the center line of the workpiece also contains the line of intersection between the planes c—c and d—d. The work support is set in at such height, that the centerline of the ready-ground workpiece will coincide with the said line of intersection. Even when the regulating wheel is skewed, the work support is thus to be adjusted in a such height that the center line of the ready-ground workpiece will come in a definite position. Therefore the adjustment can very easily be performed with the aid of a gauging finger or the like.

A specific means for adjusting the work support is illustrated in Fig. 6. The work support 5 in this case is mounted slidably between relatively fixed guides 30, 30 on a suitable base 31. The support 5 is engaged by a feed screw 32 which is rotatably held in the base 31 and which may be actuated through the medium of gears 33, 34, shaft 35 and hand wheel 36 to adjust the support upwardly and downwardly between the said guides.

Fig. 3 shows the regulating wheel 3 skewed in an angle Z in relation to the longitudinal direction of the work support so as to feed the workpieces moving through the grinding throat in the direction shown by an arrow. In order that line contact will occur between the regulating wheel and the workpiece, the regulating wheel is formed by a diamond or other truing tool. The truing tool is moved along a straight line, which is parallel with the throughfeed-direction and situated diametrically opposite the desired line of contact between the workpiece and the regulating wheel. The skewing axis $q$ (shown as a point in Figs. 3 and 4) intersects the path of the truing tool under right angle.

Fig. 4 shows the regulating wheel skewed the same angle Z as in Fig. 3 but in the opposite direction in relation to the longitudinal direction of the work support for the through-feeding of workpieces in the opposite direction as shown by an arrow. A regulating wheel which has been trued in the position shown in Fig. 3 so as to give line-contact with the workpiece, also in the position shown in Fig. 4 will have line-contact with the workpiece, because the skewing axis intersects the path of the truing tool under right angle. It is therefore possible to use the centerless grinding machine according to the invention for through-feed-grinding of workpieces alternately in the two directions. Hereby the through-feed-grinding of long and heavy rods and tubes is facilitated very much, as these workpieces can be fed in alternating directions through the machine until they are ready-ground.

In centerless grinding machines of the earlier known constructions the contact line between the workpiece and the regulating wheel as a rule was not located in the same plane as the skewing axis but on a certain distance from this plane. On account hereof the path of the truing tool must be placed on the same distance from said plane. If the regulating wheel is skewed the same angle in opposite direction, there will no longer be any line-contact between the workpiece and the regulating wheel. In centerless grinding machines of the earlier known constructions, it has therefore not been possible to perform through feed grinding in two different directions, but after each through-feeding the work-pieces must be carried back to the entrance-side of the machine to be fed through the machine again in the same direction.

Under certain conditions it might be desirable to vary the angle between the tangents of the workpiece in its points of contact with the grinding wheel and the regulating wheel. Fig. 5 shows an embodiment of the invention in which this is possible thereby, that the angle between the guides for the two slides can be varied. The grinding wheel slide 2 is slidable on a carriage 14 resting on two cylindrical surfaces 15 on the fixed bed. The axis of the cylindrical surfaces $x$ (shown as a point in Fig. 5) coincides with the line of intersection between the plane d—d containing the skewing axis and being parallel with the axis of the grinding wheel and the plane of symmetry e—e of the work support or the plane in which the centerline of the workpiece will be located. Also the plane c—c containing the axis of rotation of the grinding wheel and extending in the direction of movement of the grinding wheel slide is passing through said line of intersection. The carriage can be turned along the surfaces 15 by means of members not shown and can be locked in different angular positions as taken about the axis $x$ of the surfaces 15. Fig. 5 shows the grinding wheel slide adjusted in an angle of 165° against the direction of movement of the regulating slide 16. With this adjustment the two tangents of the workpiece will form an angle of 15° with each other. The angle between the tangents will be read directly on the graduated scale 17 on the fixed bed. In the shown embodiment the angle between the directions of the grinding wheel slide and the regulating slide can be varied between 180 and 165°, and consequently the angle between the tangents can be varied between 0 and 15°.

The invention is not restricted to the embodiments shown in the drawings but also comprises all possible modifications thereof.

Having thus described my invention, I claim and desire to secure by Letters Patent the following:

1. In a centerless grinding machine the combination with a machine bed and a grinding wheel and a regulating wheel, of two slides carrying the grinding wheel and the regulating wheel and being slidable on guides which form an angle of about 170° with each other, the point of the angle being directed from the machine bed, and a work support between said wheels.

2. In a centerless grinding machine the combination with a machine bed and a grinding wheel and a regulating wheel, of a slide carrying the regulating wheel, horizontal guides for said slide, and a slide, carrying the grinding wheel, a guide for said last-mentioned slide sloping downwardly from the first mentioned guide and forming an angle of 5 to 20 degrees with the horizontal plane, and a work support between said wheels.

3. In a centerless grinding machine the combination with a machine bed and a grinding wheel and a regulating wheel, of a slide carrying the grinding wheel and horizontal guides for said slide, and a slide carrying the regulating wheel and a guide for the last mentioned slide sloping downwardly from the first mentioned guide and forming an angle of 5 to 20 degrees with the horizontal plane, and a work support between said wheels.

4. In a centerless grinding machine the combination with a machine bed and a grinding wheel and a work support and a regulating wheel, of two slides carrying the grinding wheel and the regulating wheel and two guides for said slides forming with each other an obtuse angle of 160 to 175 degrees, the point of which angle is directed from the machine bed, the work support being arranged between the wheels and being adjustable substantially in right angle to the guides for the slide carrying the regulating wheel.

5. Centerless grinding machine according to claim 4 in which the axis of rotation of the regulating wheel is parallel with the axis of the grinding wheel and in which the work support and the wheels are so arranged, that a plane through the axis of rotation of the grinding wheel and extending in the direction of movement of the grinding wheel slide, and a second plane through the axis of rotation of the regulating wheel and extending in the direction of movement of the regulating wheel slide, and a third plane extending through the work support in its longitudinal direction and in its direction of adjustment, are all intersecting each other along a single line of intersection.

6. In a centerless grinding machine, the combination with a machine bed and a grinding wheel and a regulating wheel, of a slide carrying the regulating wheel and mounted on guides on the bed, and a slide carrying the grinding wheel and mounted on a carriage, which is turnably mounted on the bed about an axis perpendicular to the directions of movements of the grinding wheel slide and the regulating slide.

7. Centerless grinding machine according to claim 6 in which the axis of rotation of the regulating wheel is parallel with the axis of the grinding wheel and in which the turning axis of the carriage is coinciding with the line of intersection between a plane containing the axis of rotation of the grinding wheel and extending in the direction of movement of the grinding wheel slide and a second plane containing the axis of rotation of the regulating wheel slide.

8. Centerless grinding machine according to claim 6 in which the axis of rotation of the regulating wheel is skewed about an axis perpendicular to its axis of rotation in relation to the grinding wheel axis, and in which the turning axis of the carriage is coinciding with the line of intersection between a plane containing the axis of rotation of the grinding wheel and extending in the direction of movement of the regulating wheel slide and being parallel with the grinding wheel axis.

9. In a centerless grinding machine, the combination of a machine bed, guides provided on said bed, and two slides mounted on said guides, a grinding wheel mounted on one of the slides and a regulating wheel mounted on the other slide, said guides being directed substantially perpendicular to the axes of rotation of the wheels and forming with each other an obtuse angle 160 to 175 degrees, the point of which angle is directed from the machine bed, and an adjustable work support between the wheels.

CARL GUSTAV EKHOLM